United States Patent
Rates Palau et al.

(10) Patent No.: US 11,098,696 B2
(45) Date of Patent: Aug. 24, 2021

(54) METHODS OF ROTATING A HUB OF A WIND TURBINE

(71) Applicant: General Electric Renovables España, S.L., Barcelona (ES)

(72) Inventors: Sergi Rates Palau, Barcelona (ES); Kevin Schoenleber, Barcelona (ES); Isaac Gil Mollà, Nantes (FR); Shanmuga-Priyan Subramanian, Hamburg (DE)

(73) Assignee: General Electric Renovables España, S.L., Barcelona (ES)

(*) Notice: Subject to any disclaimer, the term of this patent is extended or adjusted under 35 U.S.C. 154(b) by 0 days.

(21) Appl. No.: 16/555,201

(22) Filed: Aug. 29, 2019

(65) Prior Publication Data
US 2020/0072195 A1    Mar. 5, 2020

(30) Foreign Application Priority Data
Aug. 29, 2018 (EP) .................................. 18382633

(51) Int. Cl.
*F03D 9/25* (2016.01)
*H02P 9/00* (2006.01)
*H02P 101/15* (2016.01)

(52) U.S. Cl.
CPC ............. *F03D 9/25* (2016.05); *H02P 9/008* (2013.01); *H02P 2101/15* (2015.01)

(58) Field of Classification Search
CPC . F03D 9/25; F03D 13/10; F03D 15/20; H02P 9/008; H02P 2101/15; Y02E 10/72
USPC .................................................. 290/44, 55
See application file for complete search history.

(56) References Cited

U.S. PATENT DOCUMENTS

| 2006/0147308 A1* | 7/2006 | Wobben ................ F03D 1/0658 |
| | | 416/132 B |
| 2009/0162202 A1 | 6/2009 | Nies et al. |
| 2010/0060000 A1* | 3/2010 | Scholte-Wassink .... F03D 7/047 |
| | | 290/44 |
| 2013/0069373 A1* | 3/2013 | Falkenberg ............. F03D 13/10 |
| | | 290/55 |
| 2013/0243595 A1 | 9/2013 | Falkenberg et al. |
| 2013/0301167 A1* | 11/2013 | Langel ..................... H02H 7/06 |
| | | 361/21 |

(Continued)

FOREIGN PATENT DOCUMENTS

| DE | 10013442 C1 | 10/2001 |
| EP | 1752659 A2 | 12/2007 |

(Continued)

OTHER PUBLICATIONS

European Search Report Corresponding to EP183826338 dated Feb. 20, 2019.

*Primary Examiner* — Charles Reid, Jr.
(74) *Attorney, Agent, or Firm* — Dority & Manning, P.A.

(57) ABSTRACT

In a first aspect, a system for rotating an unbalanced direct drive wind turbine is provided. The system includes an auxiliary converter and a power source coupled to the auxiliary converter, wherein the auxiliary converter is configured to supply a current to the wind turbine generator for generating a torque to rotate the hub. In a further aspect, a method of rotating an unbalanced hub of a direct drive wind turbine is provided. In a yet further aspect, a method of installing a blade in a hub of a direct drive wind turbine is provided.

20 Claims, 7 Drawing Sheets

(56) References Cited

U.S. PATENT DOCUMENTS

| | | | | |
|---|---|---|---|---|
| 2013/0320938 A1* | 12/2013 | Deng | ................ | H02K 7/09 |
| | | | | 322/90 |
| 2013/0328309 A1 | 12/2013 | Fujii et al. | | |
| 2014/0225369 A1* | 8/2014 | Bodewes | ................ | F03D 9/11 |
| | | | | 290/44 |
| 2014/0252775 A1* | 9/2014 | Hillerbrandt | ........... | F03D 80/82 |
| | | | | 290/55 |
| 2015/0311719 A1* | 10/2015 | Andresen | ................ | H02P 9/14 |
| | | | | 307/82 |
| 2015/0349655 A1* | 12/2015 | Petersen | ............... | H02M 5/458 |
| | | | | 363/35 |
| 2017/0009738 A1* | 1/2017 | Brogan | ................ | H02J 3/386 |
| 2017/0288501 A1* | 10/2017 | Eriksen | ................ | H02K 7/1807 |

FOREIGN PATENT DOCUMENTS

| | | | |
|---|---|---|---|
| EP | 2072814 A2 | 6/2009 | |
| EP | 2677168 A1 | 12/2010 | |
| EP | 2574774 A1 | 4/2013 | |

* cited by examiner

METHODS OF ROTATING A HUB OF A WIND TURBINE

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

When wind turbines are erected, the tower is generally constructed first. Then, the nacelle, which usually contains the generator and the gearbox (if present), is usually mounted on top of the tower. Then, the hub may be hoisted and mounted. Finally, the blades are hoisted one by one from a ground level towards the rotor hub and mounted therein. In an alternative method, one or more blades may be pre-assembled with the hub and be lifted together with the hub. The hub comprises a plurality of annular mounting flanges with openings. The blade comprises a plurality of fasteners, such as bolts, or pins or studs at its blade root. During installation, these fasteners are to be fitted into the openings in the mounting flanges.

The installation of wind turbine blades has become an increasingly challenging task due to the general tendency to considerably increase the size and weight of modern wind turbines.

The blades may be installed in a variety of ways, e.g. in a substantially vertical manner or substantially horizontally or at other inclined angles. However, such methods require rotation of the hub between the mounting of one blade and another for orientating the mounting flanges of the hub towards the direction of the blade during fastening of the connection. In order to correctly position the hub, torque is required for rotating the wind turbine rotor after mounting one blade in order to mount the next one. When not all blades have been mounted onto the hub, the hub is not balanced, so that the weight of one or more blades has to be carried upwards when rotating the hub. The corresponding torque may thus be very high.

The torque may be delivered using the gearbox (when present) with an external power supply for rotating the rotor. Such a system may be used in combination with a locking pin for maintaining the rotor in a desired position for installation. This is not possible in case of directly driven wind turbines as no gearbox is provided between rotor and generator. Even though the generator may be suitable for operating as a motor, it will generally not be able to deliver the required torque to rotate the hub, especially when the hub is unbalanced, i.e. when at least one blade, but not all the blades have been mounted.

Wind turbines comprise a converter or inverter to convert the power generated by the generator to make it compatible with the electrical grid. In theory, the converter of the wind turbine could be suitable to convert the power of the external power supply to run the generator as a motor. However, in order to provide a sufficient torque to make the hub rotate, the current supplied by the converter to the wind turbine generator must be very high. Furthermore, the voltage and the frequency must be very low.

For these reasons, wind turbine converters are in practice not suitable to provide a sufficient torque for rotating the hub. In order to enhance the capabilities of the wind turbine controller for increasing the current delivered to the generator, the converter has to be completely redesigned. Such a redesign may imply oversizing the wind turbine converter which may produce an extra cost and an extra weight. Furthermore, as the working ranges of the electrical parameters of such oversized converters are wider, the efficiency of the oversized converter when the wind turbine is generating power may be penalized. The efficiency of the wind turbine may therefore be reduced.

The present disclosure provides examples of systems and methods that at least partially resolve some of the aforementioned disadvantages.

SUMMARY

In a first aspect, a method of rotating an unbalanced hub of a direct drive turbine is provided. The method comprises providing an auxiliary converter and a structure supporting the auxiliary converter, mounting the structure on the wind turbine, coupling the auxiliary converter to a generator of the wind turbine, supplying power from a power source to the auxiliary converter and supplying a current from the auxiliary converter to the wind turbine generator for generating a torque for rotating the unbalanced hub.

In this aspect, the auxiliary converter may be particularly configured to convert the power provided by the power source to a suitable current supplied to the wind turbine generator that generates a torque for rotating the unbalanced hub. The "normal" wind turbine converter may therefore be designed only to control the power to be delivered to the electrical grid.

In addition, as the structure supports the auxiliary converter, the auxiliary converter may be more easily lifted and mounted on the wind turbine. As a result, the time for transporting the auxiliary converter from one wind turbine to another wind turbine may be reduced. Expensive cranes and jack-up barges may thus be more efficiently used which may represent a significant cost saving in an offshore installation. Furthermore, as the auxiliary converter is placed near to the generator, controlling the rotation of the generator rotor may be simpler.

In a further aspect, an apparatus for rotating an unbalanced direct drive wind turbine hub is provided. The system comprises an auxiliary converter configured to be coupled to a generator of the direct drive wind turbine, and configured to be coupled to a power source, and a structure supporting the auxiliary converter and configured to be temporarily supported by the direct drive wind turbine. The auxiliary converter is configured to supply a current to the wind turbine generator for generating a torque to rotate the direct drive wind turbine hub when the hub is unbalanced.

According to this aspect, the apparatus for rotating the hub may be quickly mounted on the wind turbine. Installation time may thus be reduced. The auxiliary converter of the apparatus may thus provide a current required to make the rotor hub of a direct drive wind turbine hub rotate when the hub is unbalanced.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
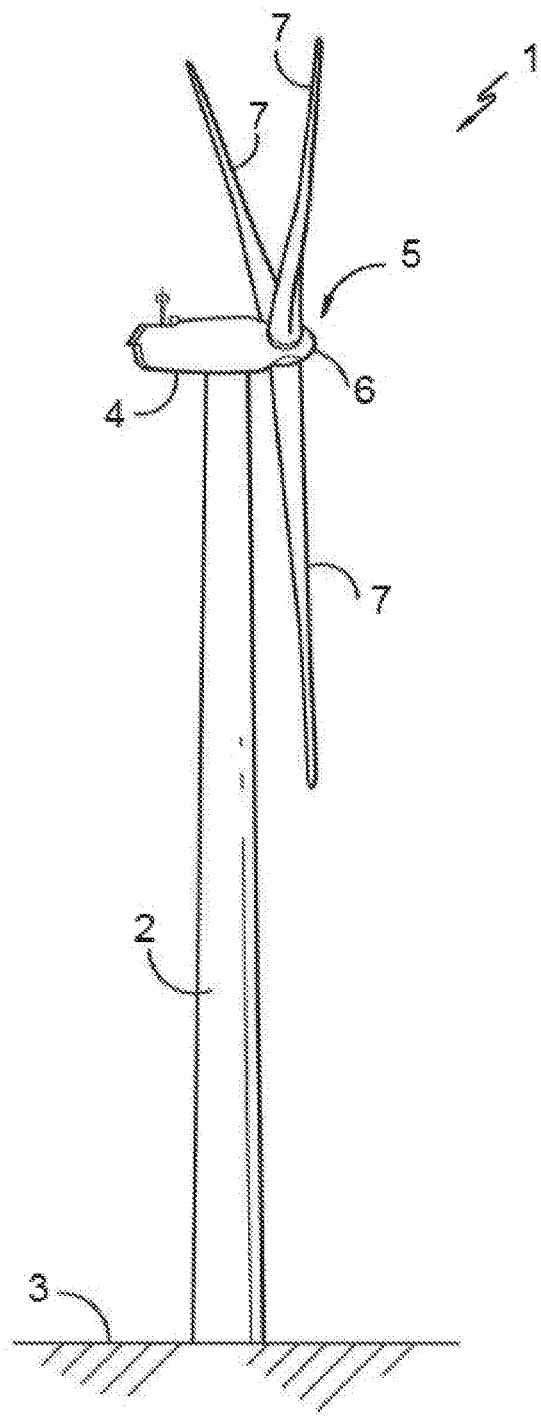
FIG. 1 illustrates a perspective view of a wind turbine according to one example.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. In this example, the wind turbine is an onshore wind turbine, in other examples it may be an offshore wind turbine.

Figure 2:
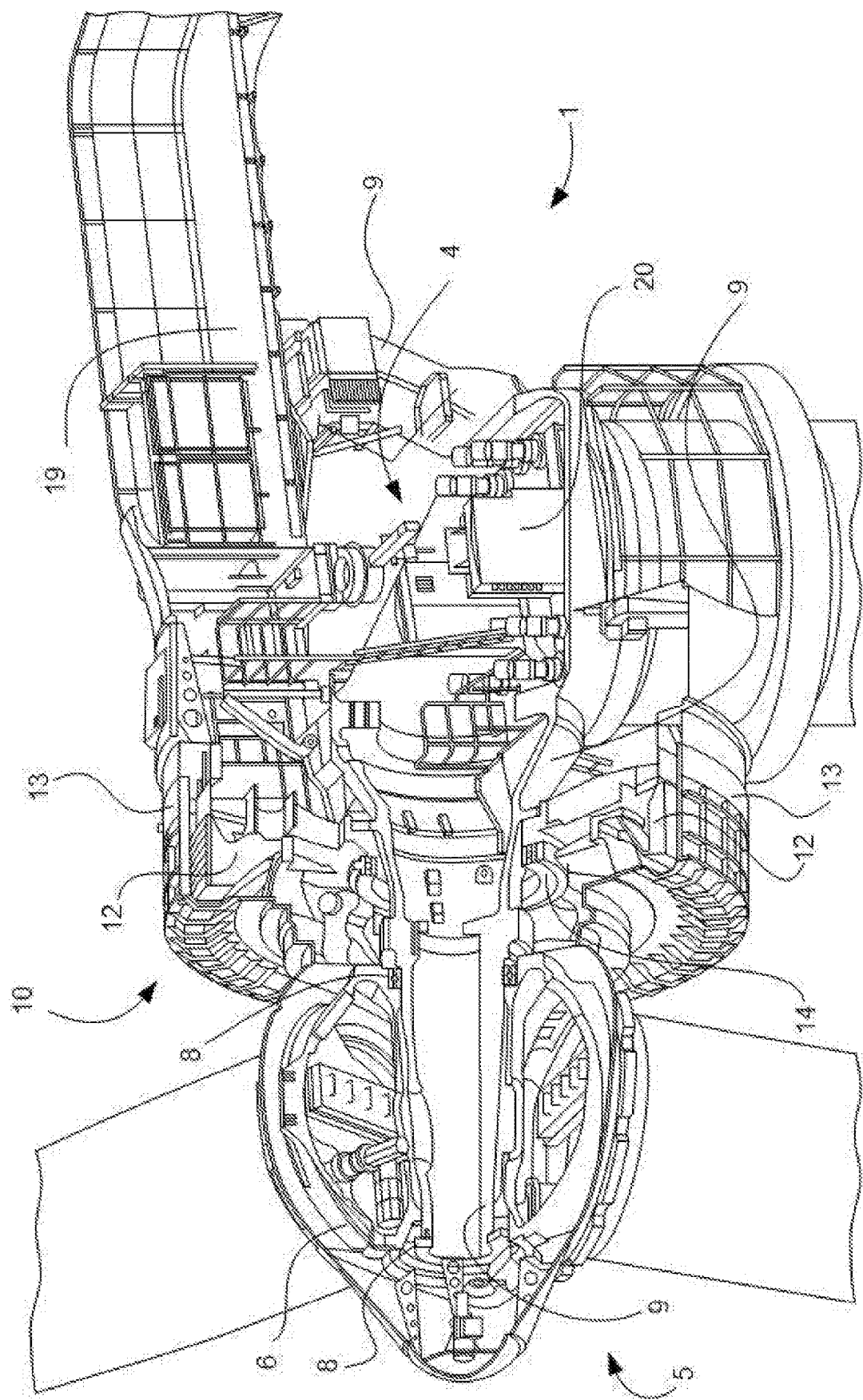
FIG. 2 illustrates a detailed, internal view of a nacelle of a wind turbine according to one example.

FIG. 2 illustrates a simplified, internal view of one example of a nacelle 4 of a direct drive wind turbine 1. As shown, the generator 10 may be disposed within the nacelle 4 or between the nacelle 4 and the rotor 5. In general, the generator 10 may be coupled to the rotor 5 of the wind turbine 1 for generating electrical power from the rotational energy generated by the rotor 5. For example, the rotor 5 of the wind turbine may include a hub 6 coupled to a rotor 12 of a generator 10 for rotation therewith. The rotation of the hub 6 may thus drive the rotor 12 of the generator 10.

In FIG. 2, the wind turbine rotor 5 may be rotatably mounted on a support portion of a main frame 9 through two rotor bearings 8. In other examples, the support portion of main frame 9 may not extend through the hub 6 and therefore the rotor may be supported by a single rotor bearing 8, commonly called as the main bearing.

The generator 10 may comprise a rotor 12 and a stator 13. The stator may be rigidly mounted on the support frame 9. The rotor may be rotatably mounted on the stator through a generator bearing 14 so that the rotor may rotate with respect to the stator around an axis.

The generator 10 may be electrically coupled to the converter 20. The wind turbine converter 20 may adapt the output electrical power of the generator to the requirements of the electrical grid. In this example, the converter 20 is placed inside the nacelle 4, however, in other examples it may be placed in other locations of the wind turbine, e.g. in the top tower portion or in the bottom tower portion. In large offshore wind turbines, the converter may be a medium voltage converter, e.g. with a nominal voltage between 2 kV and 5 kV, for reducing electrical losses and expensive cables.

The nacelle 4 may also have a helipad 19. The helipad 19 is a landing area or platform for helicopters. The helipad may include a support structure which provides stiffness to the landing area. The helipad 19 may be connected to main frame 9 and therefore loads supported by the helipad may be transferred to the main frame 9 and consequently to the tower.

Figure 3:
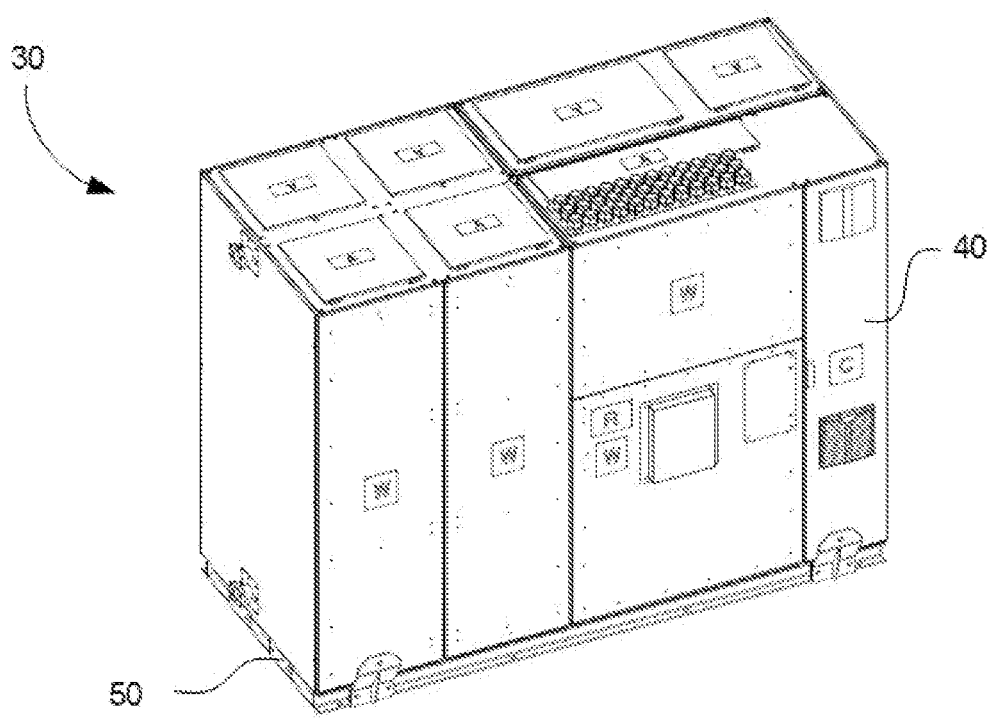
FIG. 3 illustrates an apparatus for rotating an unbalanced hub of a direct drive wind turbine according to one example.

FIG. 3 illustrates an apparatus and system 30 for rotating an unbalanced hub of a direct drive wind turbine according to one example. The apparatus according to this example comprises an auxiliary converter 40 configured to be coupled to a generator of the direct drive wind turbine, and configured to be coupled to a power source coupled to the auxiliary converted (not illustrated in FIG. 3) and a structure 50 supporting the auxiliary converter 40.

The power source (not illustrated in FIG. 3) may be a fuel generator group, a battery or an electrical grid. In some examples, the power source may be arranged on the same structure 50 or relatively closed to the auxiliary converter 50. Electrical losses may thus be reduced.

The structure 50 is configured to be temporarily supported by the wind turbine. In some of these examples, the structure may be configured to be temporarily mounted on top of the tower of the direct drive wind turbine, e.g. on of in the nacelle or on a helipad. In this example, the structure is a platform which may be mounted, e.g. supported, on the helipad. In other examples, the structure may be configured to be mounted on other parts of the wind turbine, e.g. on the base of the tower. The structure may be provided with fasteners for connecting the structure to the wind turbine, e.g. to the main frame of the wind turbine. The structure may thus provide stiffness and protection to the auxiliary converter. According to this aspect, the auxiliary converter may be safely and quickly lifted from a jack up barge.

The auxiliary converter is configured to supply a current to the wind turbine generator for generating a sufficient torque to make the hub rotate. The power delivered from the power source may be adapted by the auxiliary converter to supply a high current with a low voltage to the generator acting as a motor. The auxiliary converter may supply power for motorization the generator with a current above 1500 A, specifically above 2000 A, and more specifically above 2500 A, and a low voltage, e.g. between 50 V and 600 V. The frequency may be between 0.1 Hz and 10 Hz. These values allow the generator to rotate the hub, i.e. to compensate the gravitational forces acting on the blades when the hub is unbalanced. As the voltage and frequency provided by the auxiliary converter may be relatively low, the speed of rotation of the rotor of the generator is low and the control of the position of the rotor (and consequently of the hub) may be more accurate. Normal converters of wind turbines can generally not provide such electrical values.

In some examples, a current able to be supplied by the auxiliary converter may be higher than 150% of the nominal current of the wind turbine converter, i.e. the converter for supplying energy captured from the wind to the electrical grid. In some examples, the auxiliary converter may be configured to supply a current higher than 200% of the nominal current of the wind turbine converter.

The intensity or current is proportional to the torque and the torque necessary to make the hub rotate depends on the weight of the blades and its length. Heavy and long blades may thus require a greater torque.

In some examples, the auxiliary converter may include a controller configured to be coupled to the wind turbine controller for controlling the rotation of the hub. In other examples, the auxiliary converter controller may control the angular position of the hub without being connected to the wind turbine controller. In this way, the controller may receive the angular position of the rotor of the generator from an encoder.

The auxiliary converter controller may include one or more processor(s) and associated memory device(s) configured to perform a variety of computer-implemented functions (e.g., performing the methods, steps, calculations and the like and storing relevant data as disclosed herein) according to any of the methods herein described. According to this aspect, the controller may perform various different functions, such as receiving, transmitting and/or executing control signals, e.g. modifying the electrical parameters of the power delivered to the generator for varying the torque or the rotational speed.

The controller may also include a communications module to facilitate communications between the auxiliary controller and the wind turbine generator and/or the wind turbine controller. Further, the communications module may include a sensor interface (e.g., one or more analog-to-digital converters) to permit signals transmitted from one or more sensors to be converted into signals that can be understood and processed by the processors. It should be appreciated that the sensors may be communicatively coupled to the communications module using any suitable means as for example a wired connection or a wireless connection. As such, the processor may be configured to receive one or more signals from the sensors. In this way, a sensor may be an encoder arranged on the generator for controlling the angular position of the rotor of the generator.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

In some examples, the auxiliary converter and a wind turbine converter may be used together for rotating the hub. Currents from the auxiliary converter and from the wind turbine converter may be supplied to the generator. In some examples, these currents may be combined before being supplied to the generator. In some examples, current from the auxiliary converter may be coupled to some windings of the stator of the generator and current from the wind turbine generator may be coupled to other windings.

In the examples of using the auxiliary converter and the wind turbine converter together, the controller of the auxiliary converter may communicate with the wind turbine controller. The auxiliary converter and the wind turbine converter may thus cooperate to deliver a sufficient current required for rotating the wind turbine hub. An aspect of using both the auxiliary converter and the main converter together to provide sufficient torque for rotating an unbalanced hub is that the requirements in terms of current capability of the auxiliary converter may be lower.

Figure 4:
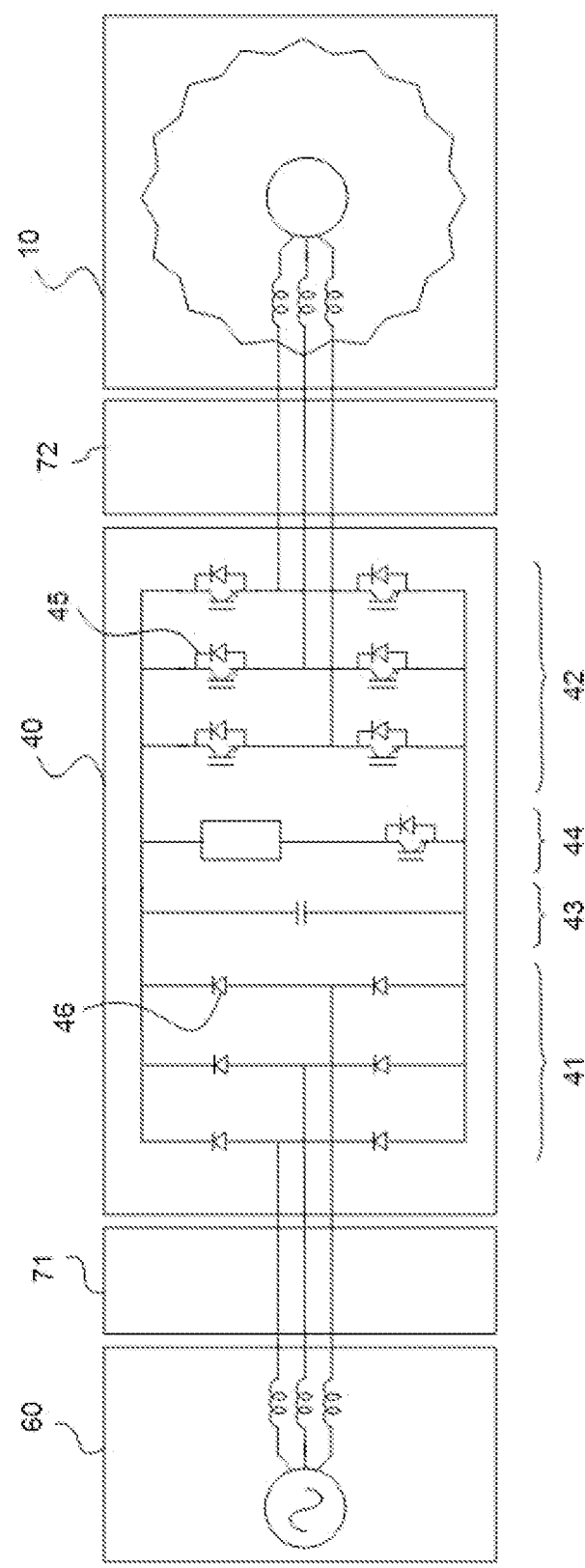
FIG. 4 schematically illustrates the electrical connection between the power source and the generator of the direct drive wind turbine according to one example.

FIG. 4 schematically illustrates the electrical connection between the power source 60 and the generator 10 of the direct drive wind turbine according to one example. The auxiliary converter 40 may include a power side 41 coupled to a power source 60 through the electrical cables 71 and a generator side 42 coupled to the generator 10 through the electrical cables 72.

The generator side 42 may comprise a plurality of IGBT's 45 (Insulated Gate Bipolar Transistor). Modules of pluralities of IGBT's 45 may be arranged in parallel for increasing the intensity provided by the converter to the generator. In this example, the power side 41 may comprise a plurality of diodes 46. In this example, the power side 41 is therefore unidirectional. In other examples, rather than diodes, the power side may include IGBT's which make it bidirectional. IGBT's may be provided in the power side 41 for example when the power source is the electrical grid.

The auxiliary converter 40 may further comprise a dc-link 43 and a braking chopper 44 for isolating the power side 41 and the generator side 42. When the rotor of the generator starts to rotate, the wind turbine generator may acts as a motor and therefore it may consume energy. However, when the rotor of the generator starts to brake because the hub is getting closer to the desired angular position, the generator may no longer be consuming energy. The excess of energy may thus be burnt by the braking chopper 44.

Figure 5:
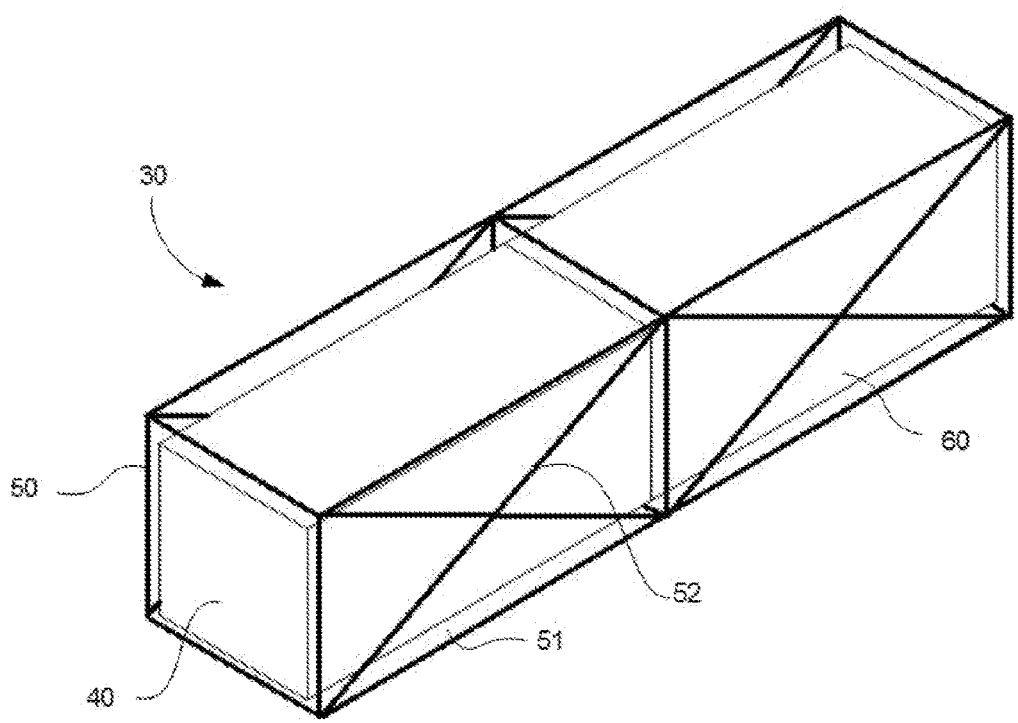
FIG. 5 schematically illustrates a system for rotating an unbalanced hub of a direct drive wind turbine according to another example.

FIG. 5 schematically illustrates a system 30 for rotating an unbalanced hub of a direct drive wind turbine according to another example. The system of FIG. 5 may comprise an auxiliary converter 40 and a power source 60. In this example, the power source 60 may include a fuel generator group, and specifically the structure 50 supports the fuel generator group. Therefore, the auxiliary converter 40 and the power source 60 are mounted on the same structure 50. The system 30 may be lifted to the top of the tower, e.g. nacelle or the helipad, together. In addition, the auxiliary converter 40 and the power source 60 may be electrically coupled before being mounted on top of the tower. It may further reduce installation costs.

In some examples, the structure 50 may comprise a base 51 and plurality of bars 52 that provides stiffness to the structure and defines the internal space of the structure. The structure may 50 may comprise a truss structure. In other examples, the structure may be a container, e.g. a shipping container.

In some examples, the structure 50 may comprise two floors on top of each other. The auxiliary converter 40 may be arranged in one floor and the power source 60, e.g. a fuel generator group, may be arranged in another floor.

In some other examples, the system 30 may comprise a first transformer coupled between the power source and the auxiliary converter, and specifically the structure may support the first transformer. In this way, the power source may be arranged apart from the auxiliary converter, e.g. in a vessel. The structure may be according to any of the examples herein described.

In these examples, the first transformer may be configured to reduce the voltage supplied from the power source, specifically from a medium voltage to a low voltage. The power from the power source to the converter may thus be transported in medium voltage, e.g. higher than 1 kV and electrical losses may consequently be reduced. In some of these of these examples, the power source may be a medium voltage electrical grid.

The system may further comprise a second transformer coupled between the first transformer and the power source. The second transformer may be arranged apart from the first transformer and from the auxiliary converter. In some of these examples, the power source may include a fuel generator group. In these examples, the second transformer may be configured to raise the voltage supplied from the power source, specifically from a low voltage (lower than 1 kV) to a medium voltage (higher than 1 kV). The first transformer may be configured to reduce the voltage supplied from the second transformer, specifically from a medium voltage to a low voltage. With this configuration, mounting the fuel generator group on top of the tower, e.g. on the helipad or on nacelle, is not necessary. Therefore, the weight to be supported by the wind turbine may be reduced. The power source and/or the second transformer may be arranged in a jack up barge or on a platform of the wind turbine foundation.

Figure 6:
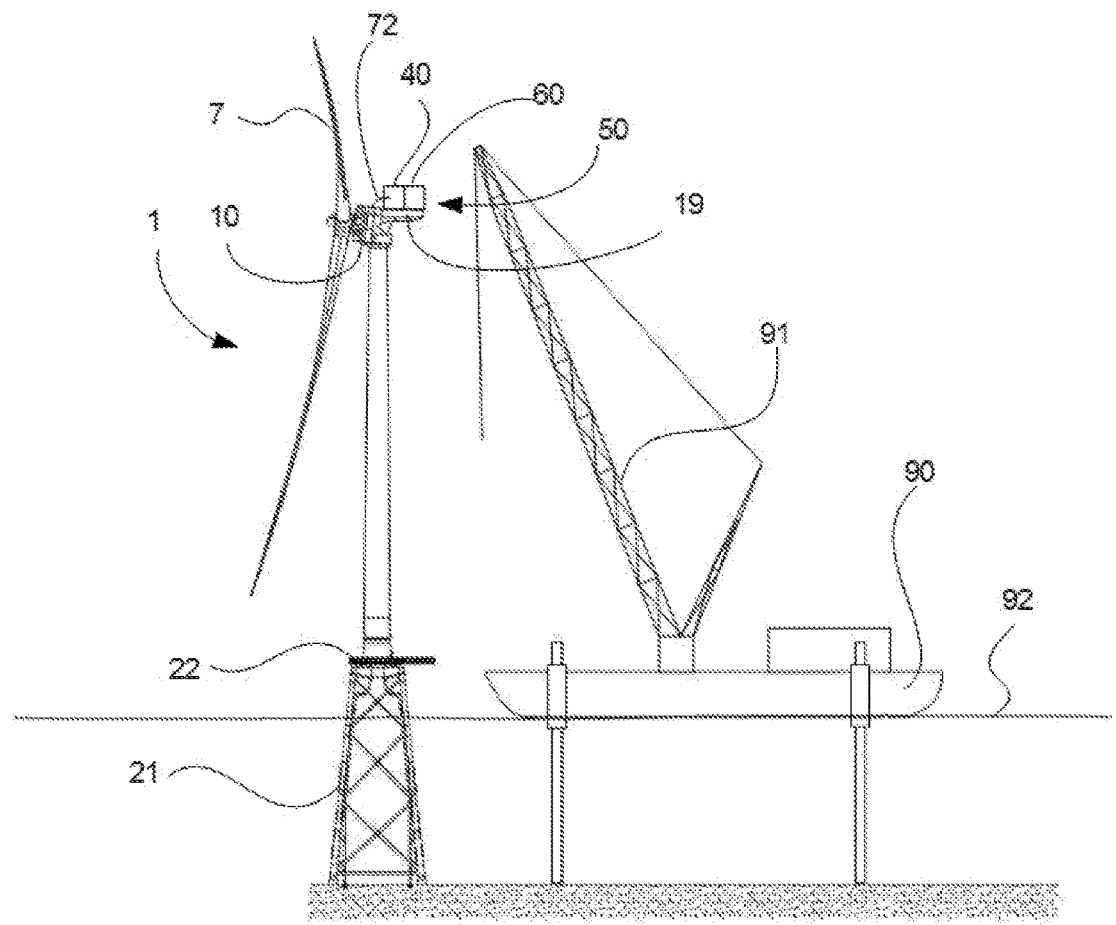
FIG. 6 schematically illustrates an auxiliary converter and a power source mounted on a direct drive wind turbine according to one example.

FIG. 6 schematically illustrates an auxiliary converter 40 and a power source 60 mounted on a direct drive wind turbine 1 according to one example. The direct drive wind turbine 1 may be mounted on a foundation structure 21, e.g. jacket. The wind turbine 1 may comprise a platform 22 for accessing the wind turbine from a boat. The platform 22 is located above the sea level 92. A jack up vessel 90 may comprise a crane 91 for lifting the auxiliary converter 40 and the structure 50. The crane 91 may also be used for lifting the blades 7 and the power source 60.

In these examples, the auxiliary converter 40 and the power source 60 may be supported by a structure 50 mounted on top of the tower, e.g. on the nacelle, in the nacelle or on the helipad 19. In other examples, the auxiliary converter may be supported by a first structure and the power source by a second structure. In some examples, the structure 50 may be connected to the helipad 19 or to the main frame of the wind turbine that supports the helipad.

The power source 60 and the first auxiliary converter 40 may be connected before being lifted from the jack up vessel 90 to the helipad 19 with the crane 91. Otherwise, they may be connecter after being mounted on top of the tower, e.g. on the helipad. In some of these examples, the power source 60 may be a fuel generator group.

The auxiliary converter may be electrically coupled to the generator 10 of the wind turbine by cables 72. In these examples, since the auxiliary converter 40 is adjacent to or in proximity of the wind turbine generator 10, the cables 72 are relatively short. Providing the auxiliary converter 40 adjacent to the wind turbine generator 10 enhances the control of the position of the rotor of the generator, and consequently of the hub, and minimizes the electrical losses.

Figure 7:
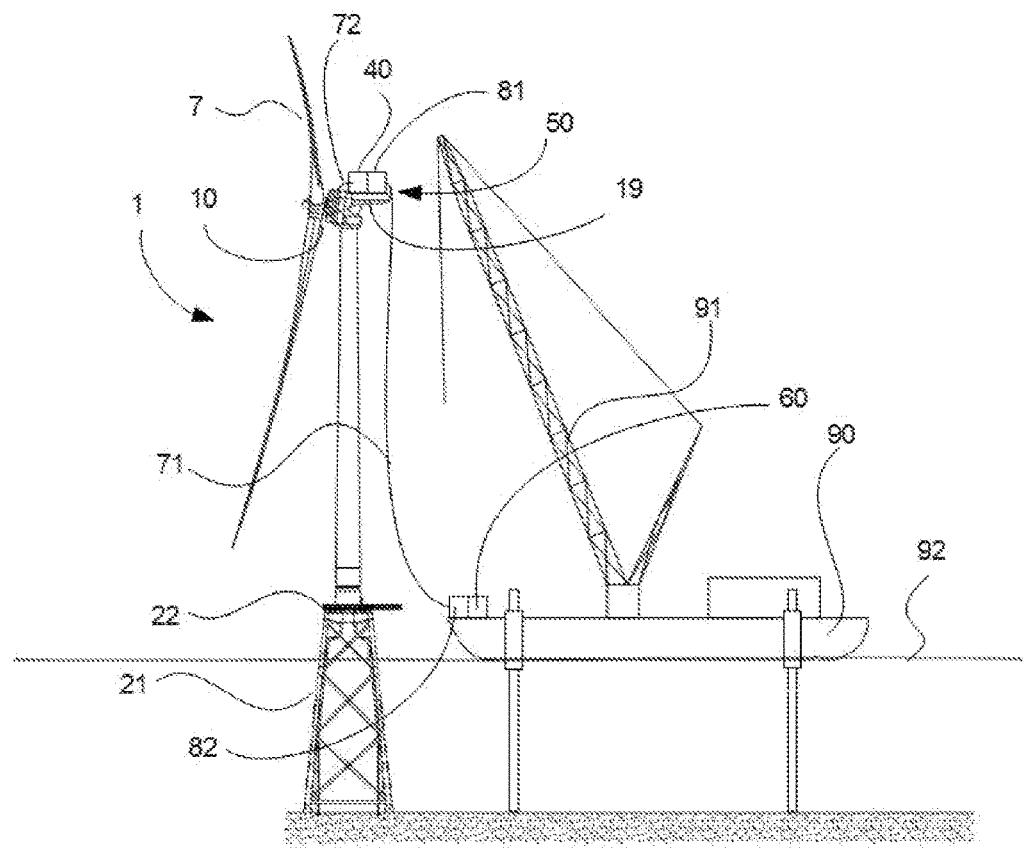
FIG. 7 schematically illustrates an auxiliary converter and a first transformer mounted on a direct drive wind turbine according to one example.

FIG. 7 schematically illustrates an auxiliary converter 40 and a first transformer 81 mounted on a direct drive wind turbine 1 according to one example. The crane 91 of the jack up vessel 90 may lift the auxiliary converter 40 and the structure 50. The crane 91 may also be used for lifting the blades 7 and the first transformer 81.

In these examples, the auxiliary converter 40 and the first transformer may be supported by a structure 50 mounted on top of the tower, e.g. on the nacelle, in the nacelle or on the helipad 19. In other examples, the auxiliary converter may be supported by a first structure and the first transformer 81 by a second structure. In some examples, the structure 50 may be connected to the helipad 19 or to the main frame of the wind turbine that supports the helipad.

The first transformer 81 and the first auxiliary converter 40 may be connected before being lifted from the jack up vessel 90 to the top of the tower, e.g. helipad 19, with the crane 91. Otherwise, they may be connected after being mounted on top of the tower.

The auxiliary converter may be electrically coupled to the generator 10 of the wind turbine by cables 72.

In these examples, the power source 60 may be provided on the vessel 90. According to aspect, as the power source 60 may be heavier than the first transformer 81, the weight supported by the nacelle, e.g. by the helipad, is lower than in those examples wherein the power source is mounted on the nacelle (FIG. 6).

A second transformer 82 may also be provided on the vessel 90. The second transformer 82 may be coupled to the power source 60, e.g. a fuel generator group. The second transformer 82 and the first transformer 81 may be coupled through the electrical cables 71. In these examples, the second transformer may be configured to raise the voltage supplied from the power source, specifically from a low voltage (lower than 1 kV) to a medium voltage (higher than 1 kV). The first transformer may be configured to reduce the voltage supplied from the second transformer, specifically from a medium voltage to a low voltage. The power from the power source to the converter may thus be transported in medium voltage, e.g. higher than 1 kV and electrical losses may consequently be reduced.

In these examples, the second transformer 82 and the power source 60 may be mounted on the jack up vessel 90. However, in other examples, the second transformer 82 and the power source 60 may alternatively mounted on the platform 22.

Figure 8:
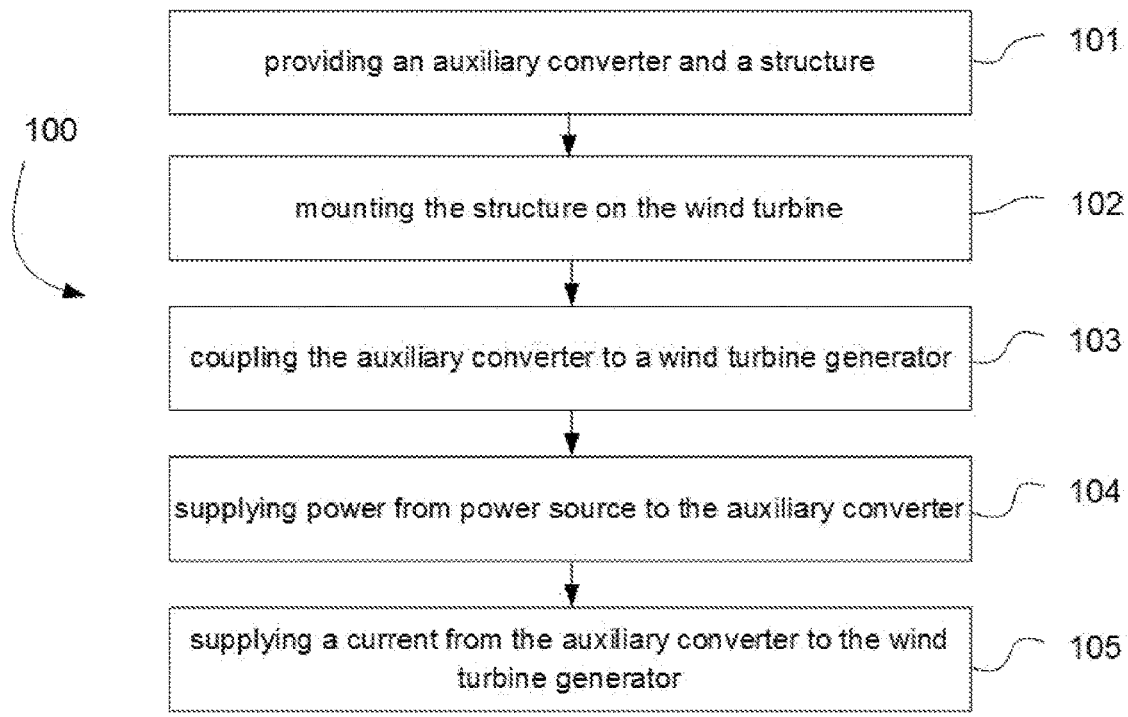
FIG. 8 is a flow diagram of a method of rotating an unbalanced hub of a direct drive wind turbine according to an example.

FIG. 8 is a flow diagram of a method of rotating 100 an unbalanced hub of a direct drive wind turbine according to an example.

Block 101 represents providing an auxiliary converter and a structure supporting the auxiliary converter. The auxiliary converter and the structure may be lifted by a crane installed on a vessel.

Mounting the structure on the wind turbine is represented at block 102. The structure supporting the auxiliary converter may be mounted on the top portion of the wind turbine tower, e.g. in or on the nacelle or on the helipad. In some examples, mounting the structure on the wind turbine may include mounting the structure on a helipad of the wind turbine. Mounting the structure with the auxiliary converter to the nacelle, e.g. to the helipad, may comprise connecting the structure to the main frame of the nacelle and/or to the structure of the helipad.

Block 103 represents coupling the auxiliary converter to a wind turbine generator by e.g. electrical cables.

Block 104 represents supplying power from a power source to the auxiliary converter. The power source may be a fuel generator group and may be supplied at a low voltage. A fuel generator group may be used for rotating the hub necessary for installing blades in offshore environments because the electrical grid may not be available during the construction of the wind farm.

Alternatively, the power source may be the electrical grid. In these examples, the hub may be rotated for dismounting a damaged blade from the blade. In these examples, a damaged blade, e.g. broken by a lightning, may unbalance the hub. Therefore, in order to position the hub in position wherein the damaged blade may be easily disconnected from the hub, e.g. in a substantially vertical position, the hub has to be rotated. As the wind turbine is connected to the electrical grid, the electrical grid may be used as power source for motorizing the wind turbine generator. In some examples, the electrical grid may be available during the construction of the wind farm and therefore the electrical grid may be used as power source.

Block 105 represents supplying a current from the auxiliary converter to the wind turbine generator for generating a torque for rotating the unbalanced hub. The power delivered from the auxiliary converter has a current that enables the generator to create a sufficient torque for rotating the unbalanced hub.

In some examples, the method may further comprise providing a first transformer coupled to the auxiliary converter. The first transformer may be mounted on the structure (mounted on the wind turbine). The first transformer may be lifted with the auxiliary converter. The first transformer may be supported by the same structure that supports the auxiliary converter or by an additional structure. The first transformer and the auxiliary converter may be coupled before lifting them and placing them on the nacelle or on the helipad.

In some of these examples, the power source may be a medium voltage electrical grid. The method may therefore comprise coupling the medium voltage electrical grid to the first transformer. The first transformer may reduce the voltage of the electrical grid to a voltage according to the voltage working ranges of the auxiliary converter, e.g. low voltage.

The power source may alternatively include a fuel generator group. In some of these examples, the method may comprise providing a second transformer and coupling the second transformer to the fuel generator group and to the first transformer. In some examples, the wind turbine may be an offshore wind turbine and the second transformer and the fuel generator may be arranged in a vessel. The second transformer may be coupled to the first transformer through electrical cables running along the tower of the wind turbine. In other examples, the second transformer and/or the fuel generator may be arranged in a platform of the foundation of an offshore wind turbine.

In these examples, the power source may generate power at low voltage, the second transformer may raise the voltage, power may then be delivered to the first transformer which reduces the voltage to a suitable working voltage of the auxiliary converter.

In other examples, the first transformer may be coupled to the electrical grid, e.g. in those cases wherein the electrical grid is available when the hub is to be rotated.

In still other examples, the power source may include a fuel generator group. The method may comprise providing the fuel generator group coupled to the auxiliary generator, and the fuel generator group mounted on the structure. The fuel generator group and the auxiliary converter may be lifted and mounted together.

In some examples, the method may include providing a system for rotating an unbalanced hub of a direct drive wind turbine according to any of the examples herein described.

In a further aspect, a method of installing a wind turbine blade in a hub of a direct drive wind turbine is provided.

Figure 9:
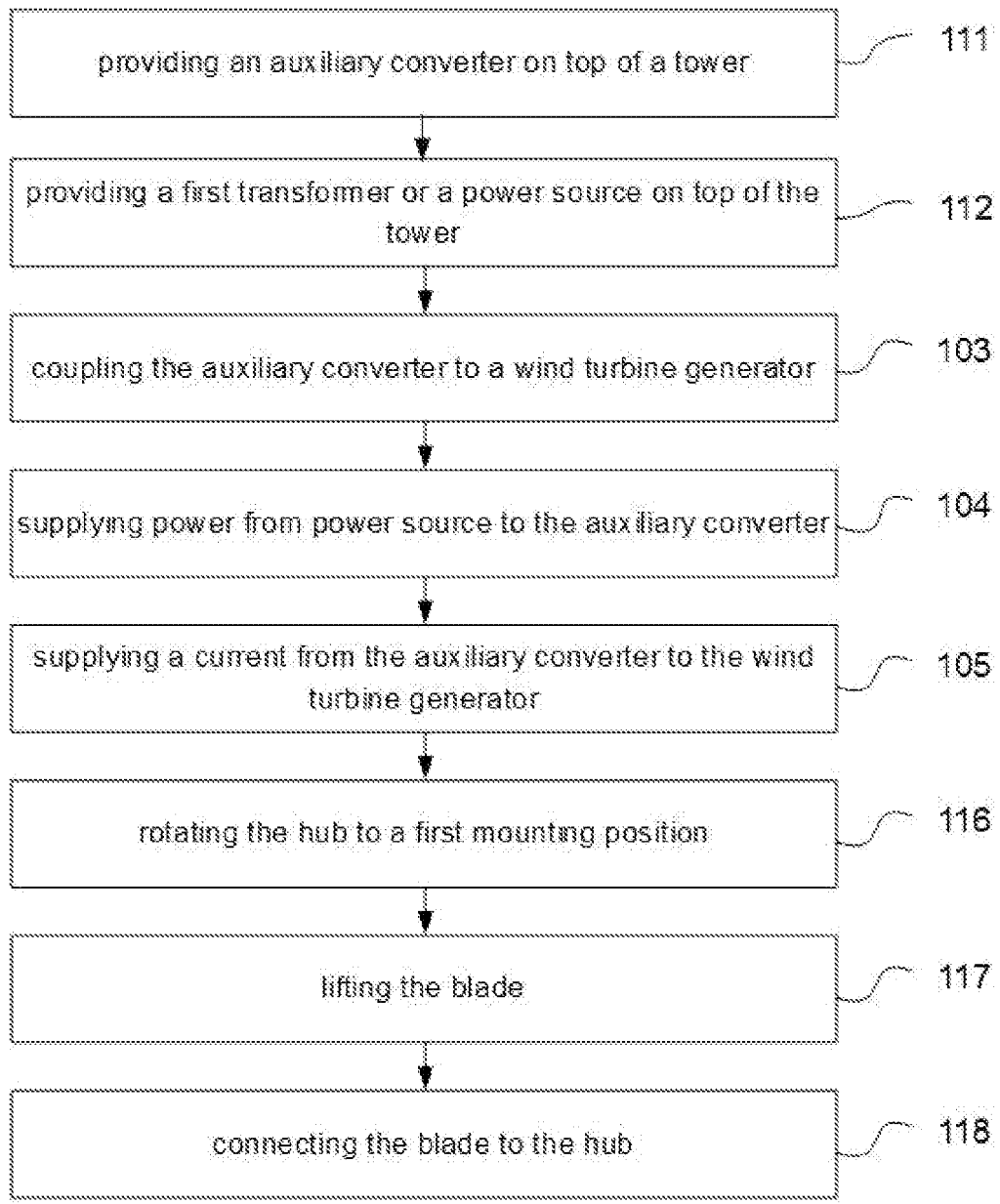
FIG. 9 is a flow diagram of a method of installing a wind turbine blade in a hub of a direct drive wind turbine according to an example.

FIG. 9 is a flow diagram of a method of installing a wind turbine blade in an unbalanced hub of a direct drive wind turbine according to an example.

At block 111, an auxiliary converter is provided on top of a tower. In some examples, the auxiliary converter may be mounted on a nacelle in a nacelle or on a helipad. The auxiliary converter may be supported by a structure. Such a structure may be supported by the nacelle, e.g. by the structure of the helipad.

Block 112 represents providing a first transformer or a power source on top of the tower of the wind turbine, e.g. on the nacelle, in the nacelle or on the helipad. In some examples, the first transformer or the power source may be lifted together with auxiliary converter. In some of these examples, the auxiliary converter and the first transformer or the power source may be supported by the same structure. Alternatively, the auxiliary converter may and the first transformer or the power source may be lifted in different operations.

At block 103, the auxiliary converter is coupled to a wind turbine generator.

Block 104 represents supplying power from a power source to the auxiliary converter. The power source may include the electrical grid, a battery or a fuel generator group.

Block 105 represents supplying a current from the auxiliary converter to the wind turbine generator for generating a torque for rotating the hub. The power delivered from the auxiliary converter has a current that enables the generator to create a sufficient torque for rotating the hub.

At block 116, the hub is rotated to a first mounting position. In the initial position, the hub may be in a position which may not be appropriate for installing the blade. The first mounting position is the angular position of the hub wherein the blade and the hub are to be connected. In this position, a first mounting surface of the hub will face the root flange of the blade to be installed. By controlling the parameters of the power delivered from the auxiliary converter to the generator, the speed of the rotation may be controlled.

For example, if the blade is to be connected in a substantially vertical position, the first mounting position of the hub may correspond to a position wherein the first mounting surface points towards the sea or the floor. In other words, in the first mounting position the first mounting surface may correspond to a 6 o'clock position, whereas the second and the third mounting surfaces may correspond to a 2 o'clock and a 10 o'clock position, as the mounting surfaces of the hub are separated by 120°.

In those cases wherein the blade is to be installed in a substantially horizontal position, the first mounting surface may be in a 3 o'clock position when the hub is positioned in the first mounting position. The remaining mounting surfaces are separated by 120° and therefore the second and the third mounting surfaces may correspond to a 7 o'clock or to a 11 o'clock position.

However, in other examples, the blade may be installed at different angles.

In some examples, the method may additionally comprise blocking the rotation of the hub by e.g. using a pin lock that blocks the rotation of the generator rotor with respect to the stator.

In some examples, at least one blade may already be connected to the hub before installing the wind turbine blade in the hub. In some of these examples, this already connected blade may be mounted on the hub without requiring the rotation of the hub. The nacelle may be installed with the rotation of the hub blocked in a position that allows a blade to be connected. In other examples, the nacelle may be installed with two blades connected to the hub in a bunny ears configuration. In this example, the blade may therefore be connected to the hub in a substantially vertical position. In these examples, the hub may be unbalanced and therefore the effect of the weight of the previously installed blades may be counteracted by the torque provided by the generator.

The method may further comprise lifting 117 and connecting 118 the blade to the hub. The root flange of the blade may be connected to the first mounting surface of the hub. Connecting the blade to the hub may involve using fasteners, e.g. studs or bolts.

In some examples, the method may further comprise rotating the hub to a second mounting position, lifting a second wind turbine blade and connecting the wind turbine blade to the hub. The hub may be rotated 120° from the first to the second mounting position.

In some examples, the wind turbine is an offshore wind turbine.

In some of these examples, the method may additionally include providing a first transformer on top of the tower of the wind turbine, e.g. in or on the nacelle or on the helipad, coupled to the auxiliary converter and providing a second transformer and a power source on a vessel. In these examples, the power source may include a fuel generator group. The method may comprise coupling the second transformer to the first transformer.

In some of these examples, supplying power from a power source to the auxiliary converter may comprise supplying power from the fuel generator group to the second transformer, supplying power from the second transformer to the first transformer, wherein the second transformer may raise the voltage supplied from the power source, specifically from a low voltage to a medium voltage; and supplying power from the first transformer to the auxiliary converter, wherein the first transformer may supply the voltage supplied from the second transformer, specifically from a medium voltage to a low voltage.

In other examples, the method of installing a wind turbine blade in a hub of a direct drive offshore wind turbine may comprise providing a power source on top of the tower of the wind turbine, e.g. in or on the nacelle or on the helipad, coupled to the auxiliary converter, wherein the power source includes a fuel generator group.

The method of installing a wind turbine blade in a hub of a direct drive wind turbine may comprise a method of rotating an unbalanced hub of a direct drive wind turbine according to any of the examples herein provided and may involve using the system for rotating an unbalanced hub according to any of the examples herein provided.

In various examples, reference has been made to a fuel generator group. In particular, this may be a diesel generator group.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each of such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An apparatus for rotating an unbalanced hub of a direct drive wind turbine that includes a generator and a converter electrically coupled to the generator, the apparatus comprising:
   an auxiliary converter configured to couple to the generator of the direct drive wind turbine to a power source;
   a structure supporting the auxiliary converter and configured to be temporarily supported by the direct drive wind turbine; and
   wherein the auxiliary converter is configured to supply a current to the wind turbine generator for generating a torque to rotate the hub of the direct drive wind turbine when the hub is unbalanced.

2. The apparatus according to claim 1, wherein the structure is configured to mount on top of a tower of the direct drive wind turbine.

3. The apparatus according to claim 1, further comprising a first transformer coupled to the auxiliary converter.

4. The apparatus according to claim 3, wherein the first transformer is configured to reduce a voltage supplied from the power source from a medium voltage to a low voltage.

5. A system for rotating an unbalanced hub of a direct drive wind turbine that includes a generator and a converter electrically coupled to the generator, comprising:
   a power source;
   an auxiliary converter configured to couple to the generator of the direct drive wind turbine and to the power source;
   a structure supporting the auxiliary converter and configured to be temporarily supported by the direct drive wind turbine; and
   wherein the auxiliary converter is configured to supply a current to the wind turbine generator for generating a torque to rotate the hub of the direct drive wind turbine when the hub is unbalanced.

6. The system according to claim 5, wherein the power source is a medium voltage electrical grid.

7. The system according to claim 5, comprising a first transformer arranged between the power source and the auxiliary power converter, and a second transformer arranged between the first transformer and the power source.

8. The system according to claim 7, wherein the power source comprises a fuel generator group and the second transformer is configured to raise the voltage supplied from the fuel generator group, and wherein the first transformer is configured to reduce the voltage supplied from the second transformer.

9. The system according to claim 5, wherein the power source comprises a fuel generator group and the structure supports the fuel generator group.

10. The system according to claim 5, comprising a controller configured to couple to a controller of the wind turbine for controlling the rotation of the hub of the wind turbine.

11. A method of rotating an unbalanced hub of a direct drive wind turbine that includes a generator and a converter electrically coupled to the generator, the method comprising:

providing an auxiliary converter and a structure supporting the auxiliary converter;

mounting the structure on the wind turbine;

coupling the auxiliary converter to the generator;

supplying power from a power source to the auxiliary converter; and supplying a current from the auxiliary converter to the generator for generating a torque for rotating the unbalanced hub.

12. The method according to claim 11, wherein mounting the structure on the wind turbine comprises mounting the structure on a top of a tower of the wind turbine.

13. The method according to claim 11, comprising coupling a first transformer to the auxiliary converter.

14. The method according to claim 13, wherein the power source is a medium voltage electrical grid and wherein the method comprises coupling the medium voltage electrical grid to the first transformer.

15. The method according to claim 14, wherein the power source comprises a fuel generator group; and wherein the method further comprises:

providing a second transformer; and coupling the second transformer to the fuel generator group and to the first transformer.

16. The method according to claim 15, wherein the wind turbine is an offshore wind turbine and the second transformer and the fuel generator group are arranged in a vessel.

17. The method according to claim 11, wherein the power source comprises a fuel generator group, comprising connecting the fuel generator group to the auxiliary converter.

18. The method according to claim 11, wherein the method further comprises installing a wind turbine blade on the unbalanced hub by:

rotating the hub to a first mounting position;

lifting the wind turbine blade; and connecting the wind turbine blade to the hub.

19. The method according to claim 18, comprising:

rotating the hub to a second mounting position;

lifting a second wind turbine blade; and connecting the second wind turbine blade to the hub.

20. The method according to claim 18, wherein the wind turbine is an offshore wind turbine, the method comprising:

mounting a first transformer on the top of the tower coupled to the auxiliary converter;

providing a second transformer on a vessel;

providing a power source on a vessel, wherein the power source includes a fuel generator group;

coupling the second transformer to the first transformer; and supplying power from the power source to the auxiliary converter through the first and second transformers.

* * * * *